INVENTOR
WALDEEN C. BUSS
BY
ATTORNEY

INVENTOR
WALDEEN C. BUSS
BY
ATTORNEY

United States Patent Office 3,554,902
Patented Jan. 12, 1971

3,554,902
PLATINUM IRIDIUM
Waldeen C. Buss, Richmond, Calif., assignor to Chevron Research Company, San Francisco, Calif., a corporation of Delaware
Filed Aug. 16, 1968, Ser. No. 753,165
Int. Cl. C10g 35/08
U.S. Cl. 208—138                                              5 Claims

ABSTRACT OF THE DISCLOSURE

Reforming a naphtha in a reaction zone in the presence of hydrogen with a catalyst composition of a porous solid carrier and 0.01 to 3 weight percent platinum and 0.001 to 1 weight percent iridium, and maintaining within the reaction zone less than about 15 p.p.m. sulfur.

BACKGROUND OF THE INVENTION

Field

This invention relates to hydrocarbon deforming processes, and more particularly to catalytic reforming of a naphtha fraction in the presence of a catalyst comprising platinum and iridium supported on a porous solid carried and maintaining less than 15 p.p.m. sulfur in the reaction zone. Preferably less than 100 p.p.m. water is also maintained in the reaction zone

Prior art

Catalysts comprising platinum, for example, platinum supported on alumina, are well known and widely used for reforming of naphthas and gasoline boiling range materials in order to produce high octane number gasolines. Platinum catalysts are highly selective toward the production of high octane aromatics and highly active for the several reactions that occur during reforming, e.g., dehydrogenation of naphthenes to aromatics, dehydrocyclization of paraffins to naphthenes and aromatics, isomerization of normal paraffins to isoparaffins and hydrocracking of relatively long-chained paraffins. Platinum catalysts are also very expensive because of the high cost of platinum and will probably become even more expensive as a result of the destricted availability of the metal. These economic factors have led the petroleum industry to seek less expensive substitutes for platinum and/or to investigate catalytic promoters to use with platinum catalysts to increase their activity, stability, and yield-octane number selectivity, thereby making platinum catalysts even more economical for reforming operations.

Iridium has been proposed for use in catalytic reforming as a promoter for platinum-containing catalysts. Thus, U.S. Patent 2,848,377 discloses reforming with a catalyst comprising platinum, iridium, and alumina. The presence of iridium is claimed to improve the activity, selectivity, and stability of platinum-containing catalysts in the hydroforming of naphthas. However, the effect of sulfur upon the performance of the catalyst, particularly the fouling rate of the catalyst, is not taught.

SUMMARY OF THE INVENTION

It has now been found that a reforming process using a catalyst comprising platinum and iridium, associated with the porous solid carrier, can be significantly improved by maintaining less than about 15 p.p.m. sulfur in the reaction zone, preferably less than 10 p.p.m. sulfur and most preferably less than 2 p.p.m. As the sulfur concentration in the reaction zone decreases below about 15 p.p.m. sulfur, the fouling rate measurably decreases, thus rendering the catalyst more useful for reforming.

The fouling rate is defined as the increase in catalyst temperature in degrees Fahrenheit per hour necessary to maintain conversion of the feed to a constant octane number gasoline product. It is also preferably for purposes of the present invention to maintain less than about 100 p.p.m. water in the reaction zone during the reforming process.

Thus, the process of the present invention comprises contacting a naphtha fraction in a reaction zone at reforming conditions and in the presence of hydrogen with a catalyst comprising 0.01 to 3 weight percent platinum and 0.001 to 1 weight percent iridium associated with a porous solid carrier, and maintaining within said reaction zone less than 15 p.p.m. sulfur. As a particularly preferred embodiment, the water content in the reaction zone is not permitted to exceed 100 p.p.m.

As another embodiment, the process of the present invention for upgrading a hydrocarbon naphtha fraction comprises contacting the naphtha fraction in a reaction zone at reforming conditions and in the presence of hydrogen with a catalyst comprising platinum and iridium associated with an alumina-containing carrier to produce an effluent containing high octane gasoline and hydrogen; separating said effluent into a gasoline stream and a hydrogen-rich stream, passing at least part of the hydrogen-rich stream through an adsorption zone and then passing said hydrogen-rich stream from said adsorption zone to said reaction zone. The sulfur in the reaction zone is thus preferably maintained below 15 p.p.m. and more preferably below 2 p.p.m., and the water in said reaction zone is preferably maintained below 100 p.p.m.

It has also been discovered that intermittent sulfiding of the platinum-iridium catalyst during reforming improves the yield of gasoline product. Thus, as the yield of $C_5+$ product begins to decline during the reforming process, injection of a slug of sulfur into the reaction zone results in an increase in the yield. Generally, no more sulfur should be injected at a time than triple the theoretical amount to sulfide the platinum and iridium present on the catalyst.

BRIEF DESCRIPTION OF THE DRAWINGS

The present invention will be better understood and will be further explained hereinafter with reference to the graphs in FIGS. 1 and 2.

Figure 2:
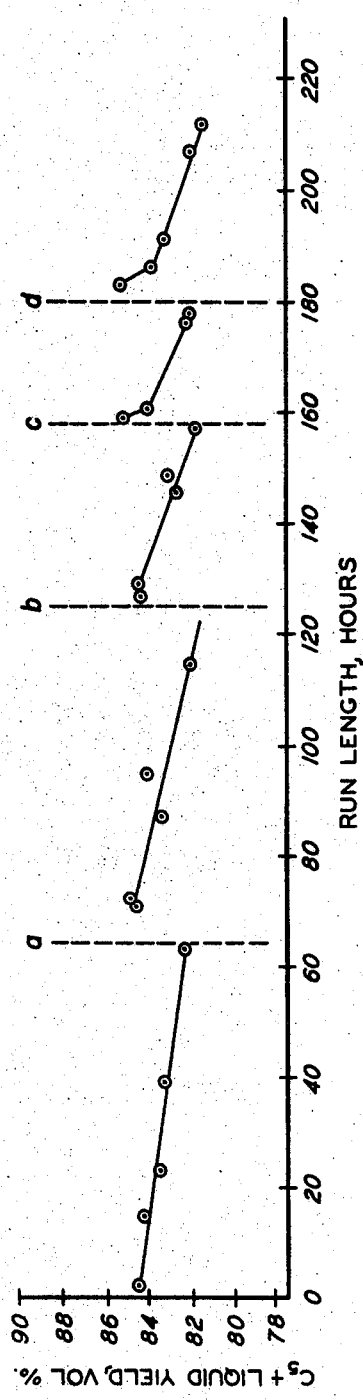

The graph in FIG. 2 shows the yield of $C_5+$ liquid product or gasoline having a 99 F-1 clear octane rating as a function of time onstream in a reforming process using a catalyst comprising platinum and iridium on alumina. The process was conducted under reforming conditions including a pressure of 160 p.s.i.g., a liquid hourly space velocity of 4, and a hydrogen to hydrocarbon mole ratio of 4. At the times indicated as *a*, *b*, *c* and *d* in the graph, a slug of sulfur was added to the reaction zone. It is noted that the yield of $C_5+$ gasoline was significantly increased by the intermittent sulfiding of the catalyst, i.e., the yield was restored to about the initial yield at start of run by the addition of the sulfur. The fouling rate of the catalyst was not adversely affected by the short contact time with the low amount of sulfur added intermittently to the reaction zone.

DESCRIPTION OF THE INVENTION

In order to obtain the full advantage, for example, increased activity and long life, of iridium as a promoter for platinum-containing catalysts, it is necessary to maintain a low sulfur concentration in the reaction zone. Thus, the sulfur concentration in the reaction zone should be less than about 15 p.p.m. sulfur to feed plus recycle gas or hydrogen, by weight, preferably less than about 10 p.p.m. sulfur, and most preferably, less than 2 p.p.m. The sulfur level in the reaction zone is determined as parts by weight of sulfur to parts by weight of feed and recycle gas or once-through hydrogen, as the case may be, at the inlet to the reaction zone. Thus, when a recycle hydrogen-rich gas stream is used in the reforming process, the sulfur is defined with respect to the feed and recycle gas plus any make-up hydrogen. If a recycle gas stream is not used, then the sulfur level is defined with respect to feed and once-through hydrogen. Actual measurement of sulfur present in the reaction zone as above defined may be done by individually measuring by conventional means the sulfur in the feed and the sulfur in the recycle gas stream and totaling the values obtained. It is understood that sulfur initially adsorbed on the catalyst, e.g., present as metal sulfides, is not considered in determining the sulfur level in the reaction zone. At the low sulfur levels, the fouling rate of the catalyst is exceptionally low, thereby enabling the reforming process to operate for long onstream periods of time. At sulfur levels above about 15 p.p.m. in the reaction zone, the catalyst exhibits a rapid rate of deactivation, thereby requiring a large increase in catalyst temperature in order to maintain a desired level of conversion. Because of the rapid increase in catalyst temperature, the onstream duration of the reforming process is significantly decreased.

In order to maintain the low levels of sulfur in the reaction zone the feed to the reaction zone must be relatively free of sulfur. Preferably the feed should contain less than 15 p.p.m. sulfur to feed, by weight. Generally, if the feed contains high concentrations of sulfur, acceptable levels can be reached by hydrogenating the feedstock in a presaturation zone using a hydrogenation catalyst which is resistant to sulfur poisoning. The organic sulfur in the feed will be converted to hydrogen sulfide which may then be removed prior to reforming by suitable conventional processes such as using molecular sieve adsorbents, or fractionation processes, etc. Suitable hydrosulfurization conditions include a temperature from 700 to 850° F., a pressure of 200 to 2000 p.s.i.g., and a liquid hourly space velocity of 1 to 5.

Furthermore, it is evident for processes utilizing a hydrogen recycle stream wherein hydrogen separated from the effluent from the reaction zone is recycled to the reaction zone that the build-up of sulfur in the recycle stream must be limited. During a reforming process using a feed containing, for example, of the order of 15 p.p.m. sulfur to feed, by weight, and using no precautions to remove sulfur from the recycle hydrogen stream, the sulfur build-up in the recycle stream will be of sufficient magnitude that the 15 p.p.m. sulfur limit in the reaction zone will be exceeded. In order to remove sulfur from the recycle stream, it is most desirable to pass the recycle hydrogen stream through an adsorption zone, for example, a molecular sieve, preferably a molecular sieve having a pore diameter of about 4 angstroms, then passing the purified recycle stream to the reaction zone. Other adsorbents besides molecular sieves may be used to adsorb sulfur contaminants, e.g., hydrogen sulfide. Thus, for example, zinc oxide and supported nickel-molybdenum oxides could be used as the adsorption media. If a recycle hydrogen stream were not used in the reforming operation, the once-through hydrogen to the reaction zone would have to be relatively free of sulfur.

It is also preferred for purposes of the present invention that the water content in the reaction zone be maintained at less than about 100 p.p.m. water to feed and recycle gas or hydrogen, by weight, preferably less than 50 p.p.m. and most preferably less than 10 p.p.m. For a dry operation, the feed should be substantially free of water, that is, contain less than 100 p.p.m. It may be desirable to free the feed of water by passing the feed through an adsorption zone, for example, a molecular sieve, prior to contacting the catalyst in the reaction zone. Also, where a recycle hydrogen stream is used, adsorption means may be used to present water from building up in the recycle stream. Generally, the adsorption means used to remove sulfur in the recycle stream may also be used to remove water. Thus, for example, a molecular sieve in the recycle hydrogen stream will substantially remove all of the water and sulfur admixed with the hydrogen.

As a particular embodiment of the present invention, it has been found desirable to periodically inject small amounts of sulfur into the reaction zone during the reforming process. Intermittent injection of small amounts of sulfur helps maintain a high yield of $C_5+$ product. The flow of feed may be discontinued while injecting the sulfur or the sulfur may be injected along with the feed; the latter course of action is preferred, thereby allowing the reforming process to operate continuously. The sulfur may be added as hydrogen sulfide, dimethyldisulfide, or other decomposable sulfur compounds. It is preferred that no more sulfur be injected than about triple the theoretical amount necessary to sulfide the noble metals, platinum and iridium; i.e., it is preferred that no more than 3 moles of sulfur per mole of noble metals, platinum and iridium, be added per injection. The small amount of sulfur intermittently injected does not remain in the reaction zone for a significant period of time. At least part of the sulfur injected will sulfide at least part of the metals, platinum and iridium, present on the catalyst. The excess sulfur is quickly stripped from the catalyst and removed from the reaction zone as a normal consequence of the flow of feed and hydrogen through the reaction zone. Thus, periodically the amount of sulfur in the reaction zone may be greater than 15 p.p.m. as a result of the injection. However, the sulfur content will only be above about 15 p.p.m. for a relatively short time, i.e., for no more than about 20 hours and generally no more than about 10 hours. As long as the sulfur concentration in the reaction zone is maintained at less than 15 p.p.m. sulfur throughout substantially the entire run length, that is, over 80 percent of the run length, and as long as the sulfur which is present in the reaction zone does not exceed 15 p.p.m. for periods longer than about 20 hours at a time, a low fouling rate can still be achieved with the platinum-iridium catalyst.

The reforming conditions used in the present invention will depend in large measure on the feed used, whether highly aromatic, paraffinic, or naphthenic, and upon the desired octane rating of the product. The temperature in the reforming operation will generally be in the range of about 600 to 1100° F. and preferably about 700 to 1050° F. The pressure in the reforming reaction will in general lie within the range from about 25 to 1000 p.s.i.g. and preferably from about 50 to 750 p.s.i.g. The temperature and pressure can be correlated with the liquid hourly space velocity (LHSV) to favor any particularly desirable reforming reaction as, for example, aromatization or isomerization or dehydrogenation. In general, the liquid hourly space velocity will be from 0.1 to 10 and preferably from 1 to 5.

Reforming generally results in the production of hydrogen. Thus excess hydrogen need not necessarily be added to the reforming system. However, it is usually preferred to introduce excess hydrogen at some stage during the operation as, for example, during startup. The hydrogen can be introduced into the feed prior to contact with the catalyst or can be contacted simultaneously with the introduction of the feed to the reaction zone. Generally, the hydrogen is recirculated over the catalyst prior to contact of the feed with the catalyst. The presence of hydrogen serves to reduce the formation of coke which tends to poison the catalyst. Moreover, the presence of hydrogen can be used to favor certain reforming reactions. Hydrogen is preferably introduced into the reforming reactor at a rate varying from about 0.5 to about 20 moles of hydrogen per mole of feed. The hydrogen can be in admixture with light gaseous hydrocarbons. At least part of the excess hydrogen removed after separation from the products will generally be recycled to the reaction zone; this recycle hydrogen must generally be purified to remove sulful and water contaminants. Thus, the hydrogen can be passed through an adsorption zone to remove water and sulfur, consequently preventing build-up of said compounds in the recycle stream.

After a period of operation when the catalyst becomes deactivated by the presence of carbonaceous deposits, the catalyst can be reactivated or regenerated by passing an oxygen-containing gas, such as air, into contact with the catalyst at an elevated temperature in order to burn carbonaceous deposits from the catalyst. The method of regenerating the catalyst will depend on whether there is a fixed bed, moving bed, or fluidized bed operation. Regeneration methods and conditions are well known in the art.

The catalyst used in the reforming process of the present invention comprises platinum and iridium in association with a porous sold carrier. The porous sold carrier or support can include a large number of materials upon which the catalytically active amounts of platinum and iridium can be disposed. The porous solid carrier can be, for example, silicon carbide, charcoal, or carbon. Preferably, the porous solid carrier is an inorganic oxide. A high surface area inorganic oxide carrier is particularly preferred, e.g., an inorganic oxide having a surface area of from 50–700 m.$^2$/gm. The carrier can be a natural or a synthetically-produced inorganic oxide or combination of inorganic oxides. Typical acidic inorganic oxide supports which can be used are the naturally occurring aluminum silicates, particularly when acid treated to increase the activity, and the synthetically-produced cracking supports, such as silica-alumina, silica-zirconia, silica-alumina-zirconia, silica-magnesia, silica-alumina-magnesia, and crystalline zeolitic alumnosilicates. Generally, however, reforming processes are preferably conducted in the presence of catalysts having low cracking activity, i.e., catalysts of limited acidity. Hence, preferred carriers are inorganic oxides such as magnesia and alumina, particularly high purity alumina.

A partcularly preferred catalytic carrier for purposes of this invention is alumina. Any of the forms of alumina suitable as a support for reforming catalysts can be used. Furthermore, alumina can be prepared by a variety of methods satisfactory for the purposes of this invention. The preparation of alumina for use in reforming catalysts is well known in the prior art. Thus, the alumina may be prepared as alumina hydrosol, alumina hydrogel, alumina xerogel, alumina monohydrate, sintered alumina, and the like.

The catalyst proposed for use in the present invention preferably comprises platinum in amounts of from about 0.01 to 3 weight percent and more preferably from about 0.05 to 1 weight percent based on the finished catalyst. Concentrations of platinum below about 0.01 weight percent are too low for satisfactory reforming operations, while on the other hand concentrations of platinum above about 3 weight percent are generally unsatisfactory because of the high cost of platinum.

The concentration of iridium in the final catalyst composition is preferably from 0.001 to 1 weight percent and more preferably from 0.01 to 0.5 weight percent. Higher concentrations of iridium could be advantageously used but the cost of iridium limits the amount incorporated on the catalyst. It is particularly preferred that the iridium to platinum plus iridium weight ratio be within the range from 0.05 to 0.3. As the iridium content increases in relation to the total metals, that is, to the platinum plus iridium content, the yield stability of the catalyst decreases; i.e., the yield decreases as the reaction temperature is increased to maintain constant conversion. Hence, it is preferred that smaller weight ratios of iridium to noble metals be used.

Although platinum and iridium can be intimately associated with the porous solid carrier by suitable techniques such as by ion-exchange, coprecipitation, etc., the metals are usually associated with the porous solid carrier by impregnation. Furthermore, one of the metals can be associated with the carrier by one procedure, e.g., ion-exchange, and the other metal associated with the carrier by another procdeure, e.g., impregnation. As indicated, however, the metals are preferably associated with the carrier by impregnation. The catalyst can be prepared either by coimpregnation of the two metals or by sequential impregnation. In general, the carrier material is impregnated with an aqueous solution of a decomposable compound of the metal in sufficient concentration to provide the desired quantity of metal in the finished catalyst; the resulting mixture is then heated to remove water. Chloroplatinic acid is generally the preferred source of platinum. Other feasible pltinum-containing compounds, e.g., ammonium chloroplatinates and polyammineplatinum salts, can also be used. Iridium compounds suitable for incorporation onto the carrier include, among other, chloroiridic acid, iridium tribromide, ammonium chloroiridate, iridium trichloride, and ammonium chloroiridite. It is contemplated in the present invention that incorporation of the metals with the carrier can be accomplished at any particular stage of the catalyst preparation. For example, if the metals are to be incorporated onto an alumina support, the incorporation may take place while the alumina is in the sol or gel form followed by precipitation of the alumina. Alternatively, a previously prepared alumina carrier can be impregnated with a water solution of the metal compounds.

Following incorporation of the carrier material with platinum and iridium, the resulting composite is usually dried by heating at a temperature of, for example, no greater than about 500° F. and preferably at about 200° F. to 400° F. Thereafter the composite can be calcined at an elevated temperature, e.g., up to about 1200° F., if desired.

The carrier containing platinum and iridium is preferably heated at an elevated temperature to convert the platinum and iridium to the metallic state. Preferably the heating is performed in the presence of hydrogen, and more preferably, dry hydrogen. In particular, it is preferred that this prereduction be accomplished at a temperature in the range of 600° F. to 1300° F., and preferably 600° F. to 1000° F.

The catalyst can be promoted for reforming by the addition of halides, particularly fluoride or chloride. Bromides are also useful for promoting the catalyst for reforming. The halides apparently provide a limited amount of acidity to the catalyst which is beneficial to most reforming operations. A catalyst promoted with halide preferably contains from 0.1 to 3 weight percent total halide content. The halides can be incorporated onto the catalyst carrier at any suitable stage of catalyst manufacture, e.g., prior to or following incorporation of the platinum and iridium. Some halide is often incorporated onto the carrier when impregnating with the platinum or the iridium; for example, impregnation with chloroplatinic acid normally results in chloride addition to the carrier. Additional halide may be incorporated onto the support simultaneously with incorporation of the metal if so desired. In general, the halides are combined with the catalyst carrier by contacting suitable compounds such as hydrogen fluoride, ammonium fluoride, hydrogen chloride, or ammonium chloride, either in the gaseous form or in a water soluble form, with the carrier. Preferably, the halide is incorporated onto the carrier from an aqueous solution containing the halide.

The catalyst can be sulfided prior to contact with the feed in the reaction zone. Sulfiding the catalyst prior to contact with the naphtha helps reduce the production of light hydrocarbon gases during startup. The presulfiding can be done in situ or ex situ by passing a sulfur-containing gas, for example, $H_2S$, in the presence of hydrogen, over the catalyst. Other presulfiding treatments are known in the prior art. Also, it has been found that on startup a small amount of sulfur, for example, $H_2S$, or dimethyldisulfide, added to the reforming zone with the feed, helps reduce the initial hydrocracking activity of the catalyst. The sulfur can be introduced in any convenient manner and at any convenient location. It can be contained in the liquid hydrocarbon feed, the hydrogen-rich gas, a recycle liquid stream, or a recycle gas stream or any combination. Generally, during the reforming process any sulfur contained on the catalyst is stripped from the catalyst and will thus be rmeoved from the reaction zone.

The process of the present invention will be more readily understood by reference to the following examples.

EXAMPLE 1

A catalyst comprising platinum and iridium supported on alumina was prepared by coimpregnating an alumina support with a solution of chloroplatinic acid and chloroiridic acid, the platinum and iridium contents of the acids being sufficiently great to provide a catalyst composite having 0.3 weight percent platinum and 0.3 weight percent iridium based on the finished catalyst. The chloride content of the catalyst was about 0.6 weight percent. The catalyst was dried at 130° F. in a partial vacuum and then reduced in hydrogen at 900° F. for one hour. Sulfiding was accomplished by contacting the catalyst at a temperature of 900° F. in the presence of $H_2S$ and hydrogen, sufficient $H_2S$ being used to give a mole ratio of sulfur to noble metals, platinum and iridium, of 2.

The catalyst was tested for reforming of naphtha having a boiling range of from 151° F. to 428° F. and comprising 23.4 volume percent aromatics, 36.5 volume percent paraffins, and 40.1 volume percent naphthenes. The feed was essentially sulfur-free. The reforming conditions included a pressure of 160 p.s.i.g., a liquid hourly space velocity of 4, and a hydrogen to hydrocarbon mole ratio of 4. Once-through hydrogen was used. The temperature was adjusted to maintain conversion to 99 F-1 clear octane product. Severe conditions were used in order to determine in a few hours how well the catalyst would perform in a commercial operation.

The reforming process was conducted in the presence of essentially no sulfur, i.e., less than 2 p.p.m. The fouling rate of the catalyst was very low in comparison with the expected fouling rate of a 0.3 weight percent platinum catalyst containing no iridium.

EXAMPLE 2

A catalyst comprising 0.1 weight percent platinum, 0.025 weight percent iridium and 0.6 weight percent chloride in association with alumina was prepared by impregnating a preformed alumina support with a solution comprising chloroplatinic acid, chloroiridic acid, and hydrochloric acid. The catalyst was dried at 300° F. in a partial vacuum for 2 hours and calcined at 700° F. in air for one hour. Thereafter the catalyst was contacted with hydrogen at 900° F. for 15 minutes. The catalyst was sulfided at 900° F. using hydrogen sulfide, then stripped of sulfur using flowing hydrogen at 900° F. for 2 hours.

The catalyst was used for reforming of a feed similar to that described in Example 1, and under the same reforming conditions used in Example 1. Essentially no sulfur was present in the reaction zone during reforming.

The starting temperature of the reforming process was 940° F.; the fouling rate was 1.7° F. per hour. Under similar reforming conditions the fouling rates of commercial catalysts comprising from about 0.6 to 0.75 weight percent platinum on alumina, no iridium being present, would be from about 1.7 to 2.8. Thus it is evident that a very small amount of iridium in conjunction with a low level of platinum results in a catalyst having temperature stability at least equivalent to, and generally superior to, that of high level platinum catalysts. This represents a substantial savings in terms of the amount of noble metal required to produce an efficient reforming catalyst.

EXAMPLE 3

A catalyst comprising platinum and iridium on alumina was prepared by contacting a previously prepared platinum-alumina composite comprising about 0.6 weight percent platinum supported on alumina with a solution of chloroiridic acid. The platinum-alumina composite was allowed to absorb the entire volume of chloroiridic acid solution used. Enough iridium was present in the acid solution to provide a catalytic composite having 0.1 weight percent iridium, based on the finished catalyst. The platinum-iridium composite was dried at 250° F. for 2 hours, then heated for 10 minutes at 500° F. in flowing hydrogen and then heated for 30 minutes at 930° F. in flowing hydrogen. At the end of the 930° F. reduction, the catalyst was sulfided by adding $H_2S$ to the reducing atmosphere. The finished catalyst contained 0.6 weight percent chloride.

The catalyst was tested in a reforming operation with a hydrocarbon naphtha feed essentially free of sulfur. Once-through hydrogen which was essentially free of any sulfur impurities was used. Less than 2 p.p.m. sulfur was maintained in the reaction zone. The feed was the same as that described in Example 1. The reforming process was conducted under the same conditions described in Example 1. The catalyst starting temperature to produce a 99 F-1 clear octane product was about 929° F. The fouling rate was approximately 0.34° F. per hour. A catalyst comprising 0.6 weight percent platinum supported on alumina with no iridium present would exhibit a fouling rate of about 1.7° F. per hour under similar reforming conditions.

The following example shows the performance of the platinum-iridium catalyst for reforming with various levels of sulfur in the reaction zone. In particular, the following example shows the significant improvement in reforming with a platinum-iridium catalyst when the sulfur level in the reaction zone is maintained at less than about 15 p.p.m.

EXAMPLE 4

A series of reforming runs were made using the platinum-iridium catalyst with various sulfur levels in the reaction zone. The catalyst used for each run comprised 0.1 weight percent platinum, 0.025 weight percent iridium, and 0.6 weight percent chloride in association with alumina, prepared and pretreated as described in Example 2. The reforming conditions were the same for the several runs and included a pressure of 160 p.s.i.g., a liquid hourly space velocity of 4 and a hydrogen to hydrocarbon mole ratio of 4, once-through hydrogen being used. The feed in each instance was the same and is described in Example 1. The sulfur was added as dimethyldisulfide in the feed.

The starting temperature of each run was within the range of 930–940° F. and the initial octane rating of the product was 99. The catalyst temperature was raised continuously during each run at a rate of about 1.5–2.0° F./hr. The fouling rate of the catalyst, i.e., the increase in catalyst temperature necessary to maintain constant conversion of the feed to 99 octane product, was determined using standardized correlations. The following table reports the data.

TABLE I

| Run No.: | Sulfur, p.p.m., in reaction zone | Fouling rate |
| --- | --- | --- |
| 1 | 0 | 1.3-2.1 |
| 2 | 1 | 2.4 |
| 3 | 4 | 4.0 |
| 4 | 15 | 7.0 |
| 5 | 50 | 6.0 |

The data in the table shows the extreme sensitivity of the platinum-iridium catalyst to low levels of sulfur in the reaction zone. The reason for the range in fouling rates at 0 p.p.m. sulfur is due to the difficulty in maintaining 0 p.p.m. sulfur in the reaction zone. Small amounts of sulfur appear from the feed or from the reactor walls.

It is only when less than about 15 p.p.m. sulfur is present in the reaction zone that the fouling rate of the catalyst decreases significantly with change in sulfur concentration. Thus lowering the sulfur level below about 15 p.p.m. will progressively result in an improvement in the temperature stability of the catalyst. When the sulfur content in the reaction zone is above about 15 p.p.m., the fouling rate of the catalyst is high, and remains high as the sulfur concentration is increased. Thus, the fouling rate of the catalyst at 15 p.p.m. sulfur is of the same order of magnitude as the fouling rate of the catalyst at 50 p.p.m. sulfur in the reaction zone. It was entirely unexpected that the platinum-iridium catalyst would be as sulfur sensitive at levels of sulfur below 15 p.p.m. in the reaction zone as the data in the table shows.

EXAMPLE 5

A catalyst comprising 0.6 weight percent platinum, 0.1 weight percent iridium, and 0.6 weight percent chloride was prepared by a method similar to that described in Example 3. The impregnated composite was dried at 300° F. for 8 hours and calcined at 700° F. for 1.4 hours, and finally reduced in hydrogen at 900° F. for 0.5 hour. The catalyst was sulfided prior to being used in reforming by contacting the catalyst at a temperature of 900° F. for 0.2 hour in the presence of hydrogen sulfide and hydrogen. The sulfur was stripped from the catalyst by passing hydrogen over the catalyst as 900° F. for 2 hours.

The catalyst was tested for reforming using the hydrocarbon naphtha described in Example 1. The reforming process was conducted under reforming conditions including a pressure of 300 p.s.i.g., a liquid hourly space velocity of 3, and a hydrogen to hydrocarbon mole ratio of 4. The temperature was adjusted to maintain conversion of the naphtha to 100 F-1 clear octane product. Effluent from the reaction zone was passed to a separator to separate the high octane gasoline product from a hydrogen-rich gas stream. The hydrogen-rich gas stream was recycled to the reaction zone.

Figure 1:
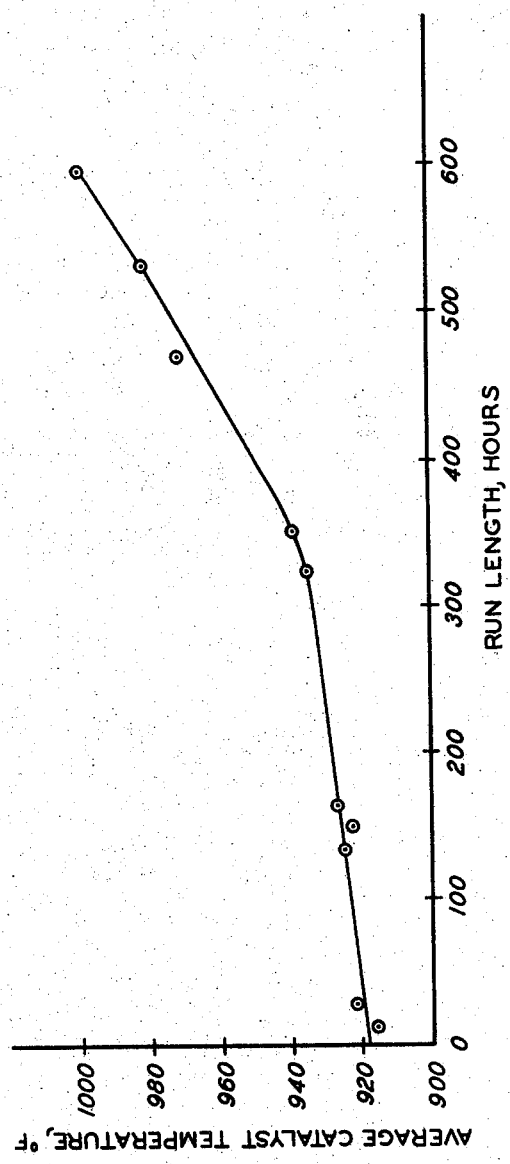
FIG. 1 shows the average catalyst temperature as a function of length of test or hours onstream required to maintain a 100 F-1 clear octane product in a reforming operation using a catalyst comprising 0.6 weight percent platinum and 0.1 weight percent iridium associated with alumina. The reforming conditions included a pressure of 300 p.s.i.g., a liquid hourly space velocity (LHSV) of 3, and a hydrogen to hydrocarbon mole ratio of 4. During the first approximately 325 hours onstream the sulfur in the reaction zone was less than about 2 p.p.m. After about 325 hours, the sulfur was increased to greater than 2 p.p.m. It is noted that when less than about 2 p.p.m. sulfur was present in the reaction zone, the fouling rate was very small, that is, of the order of 0.05° F. per hour. Addition of greater than 2 p.p.m. sulfur to the reaction zone resulted in a significant increase in the fouling rate, that is, after about 300 hours the fouling rate was of the order of 0.23° F. per hour.

The graph in FIG. 1 shows the average catalyst temperature necessary to maintain 100 F-1 clear octane product at the reforming conditions above specified as a function of the hours onstream. For substantially the first 325 hours the sulfur level in the reaction zone was maintained at less than about 2 p.p.m. sulfur. The hydrogen-rich gas stream separated from the gasoline product was passed through an adsorption zone containing a crystalline zeolitic molecular sieve having pore dimensions of about 4 angstroms. The molecular sieve removed substantially all the sulfur, as hydrogen sulfide, and all the water from the recycle stream. After about 260 hours the molecular sieve was removed from the reforming system. Sulfur was thus gradually allowed to build up in the recycle stream until after about 325 hours the sulfur level in the reaction zone was greater than about 2 p.p.m. and the water content in the reaction zone was greater than about 10 p.p.m.

When sulfur was excluded from the reaction zone, that is, maintained less than 2 p.p.m., the fouling rate of the platinum-iridium catalyst was exceptionally low. However, as can be seen from the graph in FIG. 1, after sulfur was allowed to build up in the recycle stream so that greater than 2 p.p.m. sulfur was present in the reaction zone, the fouling rate increased. A significant increase in the average catalyst temperature was necessary in order to maintain constant conversion of the naphtha to 100 F-1 clear octane product.

The sulfur level in the reaction zone may exceed 2 p.p.m. for a short period of time, for example, of the order of 10 to 20 hours without irreversibly affecting the fouling rate of the catalyst. Thus, in the reforming process described above, the molecular sieve was removed from the recycle stream for two short periods of time during the first 260 hours and the sulfur level allowed to increase above 2 p.p.m. in the reaction zone for the short periods of time, that is, the order of 10 to 20 hours, and no significant adverse effect was noted on the fouling rate. It is only when the sulfur level in the reaction zone gets significantly above 2 p.p.m., e.g., above 15 p.p.m., for a substantial period of time, that is, greater than about 20 hours, that the fouling rate is severely affected.

EXAMPLE 6

A catalyst comprising 0.1 weight percent iridium and 0.6 weight percent platinum on alumina was prepared and pretreated substantially as indicated in Example 5. The catalyst was tested for the reforming of a hydrocarbon naphtha having the same specifications as the feed in Example 1 at reforming conditions including a pressure of 160 p.s.i.g., a liquid hourly space velocity of 4, and a hydrogen to hydrocarbon mole ratio of 4, using once-through hydrogen. The temperature was adjusted to maintain conversion to 99 F-1 clear octane product.

As the yield stability of the catalyst declined, that is, as the yield of $C_{5+}$ product decreased during the run length, sulfur was periodically injected into the reaction zone. No more than about 3 moles of sulfur to mole of noble metals, platinum and iridium, on the catalyst, was used for each injection. In particular, only 2.2 moles of sulfur to mole of noble metal was used. Sulfur injection was made after 64 hours, 125 hours, 158 hours, and again at 180 hours onstream time. The excess sulfur injected was rapidly stripped from the catalyst as a normal consequence of the reforming process and hence removed from the reaction zone. No hydrogen recycle stream was used in the present process; hence, no sulfur was recycled to the reaction zone. The results of the sulfur injection are shown in the graph in FIG. 2 which shows the yield of $C_{5+}$ product as a function of the run length or onstream time. Sulfur injections were made at the times indicated as $a$, $b$, $c$ and $d$. Sulfur was injected each time as $H_2S$ with the exception of time $d$ when dimethyldisulfide was used. It is seen that sulfur injections increase the yield to substantially the initial level obtained at the start of run. Furthermore, the intermittent injection of small amounts of sulfur, which sulfur was subsequently removed from the reaction zone, did not adversely affect the temperature stability, that is, the fouling rate, of the platinum-iridium catalyst.

Thus, the present process of injecting small amounts of sulfur periodically into the reaction zone is a valuable method for maintaining high yields of gasoline products. Since the sulfur is only present for a very short time in the reaction zone, the temperature stability of the catalyst is not adversely affected; hence, long run lengths can be obtained.

The foregoing disclosure of this invention is not to be considered as limiting since many variations can be made by those skilled in the art without departing from the scope or spirit of the appended claims.

What is claimed is:

1. A reforming process which operates for a total onstream time of substantially at least 325 hours prior to replacement of catalyst charge, comprising:

contacting hydrogen, a naphtha feedstock having below 15 p.p.m. sulfur and a catalyst, said catalyst including alumina, 0.1 to 3 weight percent of a platinum component, 0.001 to 1 weight percent of an iridium component and 0.1 to 3 weight percent halide, in a reforming zone at reforming conditions;

maintaining during said total onstream time, except for any sulfur injection periods of not more than 20 hours, in said reaction zone, a sulfur content below 15 p.p.m. and a water content below 100 p.p.m.; and periodically injecting no more than about 3 moles of sulfur per mole of platinum and iridium into the reaction zone, the injecting being for a time of no more than about 20 hours and the yield of high octane gasoline being increased following any injecting.

2. A process as in claim 1, wherein the iridium and platinum are present in amounts such that a ratio, consisting of the weight of iridium to the combined weights of iridium and platinum, falls within the range from 0.05 to 0.3.

3. A process as in claim 1, wherein the sulfur content, in the reaction zone, is below 2 p.p.m.

4. A process as in claim 1, wherein the water content, in the reaction zone, is below 10 p.p.m.

5. A process as in claim 1, including:

recovering an effluent including high octane gasoline and hydrogen;

separating the effluent into a gasoline stream and a hydrogen-rich recycle stream;

recovering the gasoline stream;

contacting the hydrogen-rich recycle stream with a molecular sieve that adsorbs sulfur and water contaminants; and then conducting the hydrogen-rich recycle stream away from the molecular sieve and into the reaction zone.

References Cited

UNITED STATES PATENTS

| 2,848,377 | 8/1958 | Webb | 208—138 |
| 2,939,847 | 6/1960 | Smith et al. | 208—138 |
| 2,952,611 | 9/1960 | Haxton et al. | 208—138 |
| 3,234,120 | 2/1966 | Capsuto | 208—138 |
| 3,330,761 | 7/1967 | Capsuto et al. | 208—138 |
| 3,359,198 | 12/1967 | Lengemann | 208—138 |
| 3,415,737 | 12/1968 | Kluksdahl | 208—138 |

FOREIGN PATENTS

| 1,108,361 | 6/1961 | Germany | 208—138 |

HERBERT LEVINE, Primary Examiner

U.S. Cl. X.R.

208—139; 252—466